United States Patent
Appalaraju et al.

(10) Patent No.: US 10,965,948 B1
(45) Date of Patent: Mar. 30, 2021

(54) HIERARCHICAL AUTO-REGRESSIVE IMAGE COMPRESSION SYSTEM

(71) Applicant: Amazon Technologies, Inc., Seattle, WA (US)

(72) Inventors: Srikar Appalaraju, Kirkland, WA (US); Yash Patel, Palo Alto, CA (US); R. Manmatha, San Francisco, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/713,910

(22) Filed: Dec. 13, 2019

(51) Int. Cl.
*H04N 19/20* (2014.01)
*H04N 19/91* (2014.01)
*H04N 19/33* (2014.01)
*G06T 9/00* (2006.01)

(52) U.S. Cl.
CPC ............ *H04N 19/20* (2014.11); *G06T 9/002* (2013.01); *H04N 19/33* (2014.11); *H04N 19/91* (2014.11)

(58) Field of Classification Search
None
See application file for complete search history.

(56) References Cited

U.S. PATENT DOCUMENTS

| | | | |
|---|---|---|---|
| 8,681,858 B2 * | 3/2014 | Wang | H04N 19/172 375/240.03 |
| 10,264,265 B1 | 4/2019 | Brailovskiy | |
| 10,341,670 B1 | 7/2019 | Brailovskiy et al. | |

* cited by examiner

*Primary Examiner* — Chikaodili E Anyikire
(74) *Attorney, Agent, or Firm* — Knobbe Martens Olson & Bear, LLP

(57) ABSTRACT

The present application relates to a multi-stage encoder/decoder system that provides image compression using hierarchical auto-regressive models and saliency-based masks. The multi-stage encoder/decoder system includes a first stage and a second stage of a trained image compression network, such that the second stage, based on the image compression performed by the first stage, identify certain redundancies that can be removed from the bit string to reduce the storage and bandwidth requirements. Additionally, by using saliency-based masks, distortions in different sections of the image can be weighted differently to further improve the image compression performance.

20 Claims, 9 Drawing Sheets

HIERARCHICAL AUTO-REGRESSIVE IMAGE COMPRESSION SYSTEM

BACKGROUND

As cameras in portable electronic devices produce more detailed images and applications incorporate images and video content, there is an increasing need for better image compression techniques. In such cases, image and/or video content is typically compressed to reduce storage and bandwidth requirements. Image compression usually involves a trade-off between file size and retained quality of an image. The disclosed technology is directed to improved image compression techniques.

DETAILED DESCRIPTION

Introduction

Figure 1:
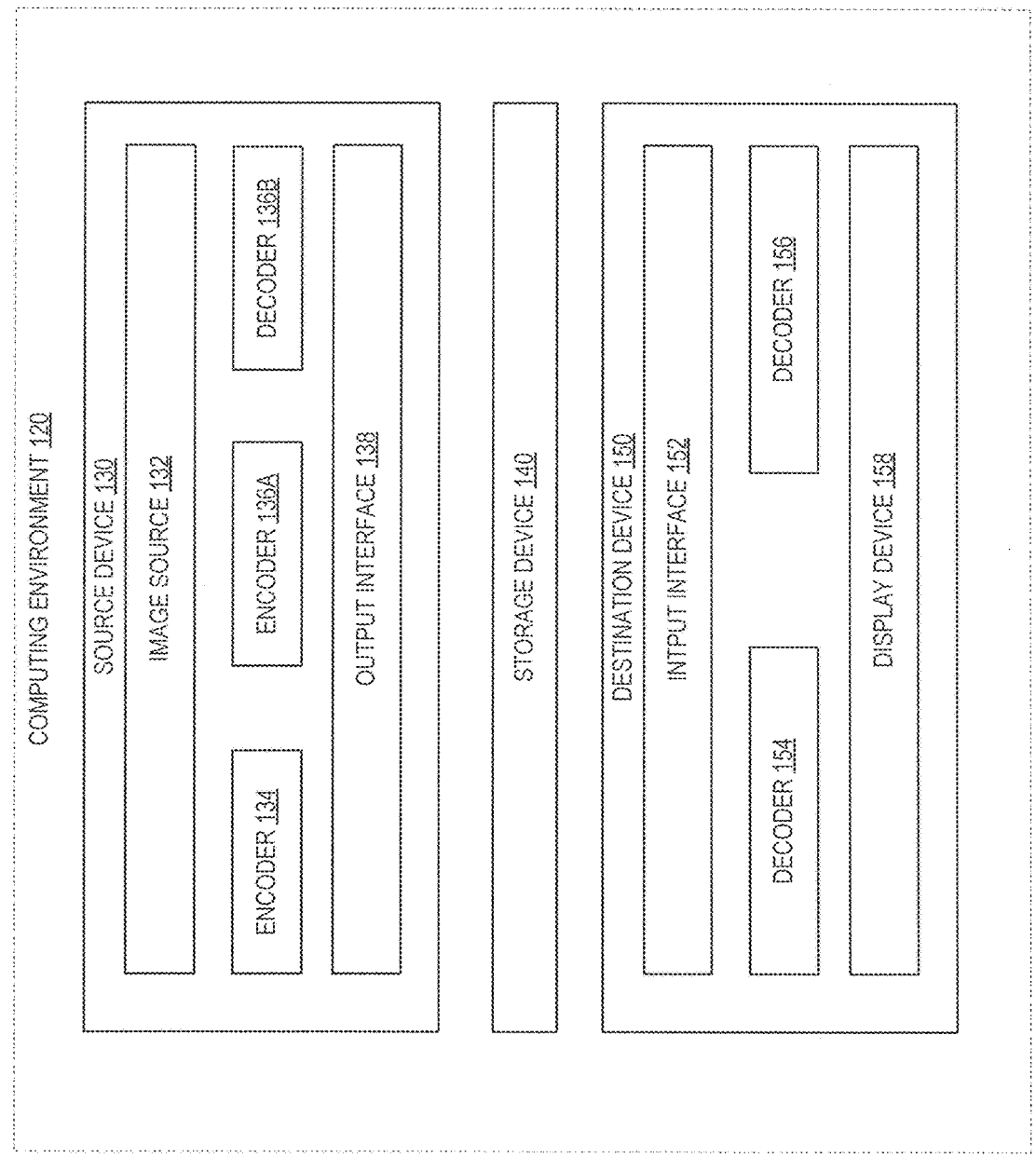
FIG. 1 depicts a block diagram illustrating an example computing environment that may utilize image encoding and decoding techniques in accordance with aspects described in this disclosure.

A digital image, such as a video image, a TV image, a still image or an image generated by a video recorder or a computer, may consist of pixels or samples arranged in horizontal and vertical lines. The number of pixels in a single image can range from tens of thousands to millions. Each pixel typically contains luminance and chrominance information. Without compression, the sheer quantity of information to be conveyed from an image encoder to an image decoder would render real-time image transmission impossible. To reduce the amount of information to be transmitted, a number of different compression methods, such as PNG and JPEG standards, have been developed.

Some of such compression methods involve a single encoder and a single decoder. However, in such single-stage encoder/decoder implementations, the coded bit string may include certain redundancies that unnecessarily increase the storage and bandwidth requirements without significantly improving the image quality. Thus, an improved compression method that can identify and remove such redundancies from the coded bit string is desired.

Further, these and other compression methods may also optimize compression performance over the entire image without taking into account specific regions of interest that may be of more importance to a potential viewer. Such methods may result in an unnecessarily high number of bits allocated to capturing the details in non-salient regions that may be of less importance to the potential viewer (e.g., sky in the background), and an insufficient number of bits allocated to capturing the details in salient regions that may be of more importance to the potential viewer (e.g., facial features of a person in the foreground). Thus, an improved compression method that can allocate a greater number of bits to salient regions of interest than to other regions is desired.

This present disclosure relates to a multi-stage encoder/decoder system that provides image compression using hierarchical auto-regressive models and saliency-based masks. The multi-stage encoder/decoder system includes two (or more) stages such that one stage can, based on the image compression performed by another stage, identify additional information that can be removed from the coded bit string to reduce the storage and bandwidth requirements without degrading (or significantly degrading) the image quality. Additionally, by using saliency-based masks, distortions in different sections of an image can be weighted differently to allocate a greater number of bits to certain salient features in the image than other portions of the image, such that visual perception of clarity can be improved without further increasing the storage and bandwidth requirements.

There are several novel image compression techniques described in the present disclosure. Disclosed is a novel hierarchical auto-regressive deep learned model with a feed-forward encoder-decoder for image compression. Also disclosed is an alternative learned perceptual metric, trained on compression specific artifacts. Since this metric is a fully-convolutional-network (FCN), it is differentiable and is used for training. In one embodiment, the model accounts for salient regions in the images by: (a) allocating a greater number of bits to the salient regions that to other regions (e.g., non-salient regions) and (b) giving higher weight to their reconstruction (e.g., distortions in the salient regions suffer a greater penalty than those in the non-salient regions).

These and other aspects of the disclosure will now be described with regard to certain examples and embodiments, which are intended to illustrate but not limit the disclosure. Although the examples and embodiments described herein will focus, for the purpose of illustration, on specific calculations and algorithms, one of skill in the art will appreciate the examples are illustrative only, and are not intended to be limiting.

Overview of Example Computing Environment

FIG. 1 depicts a computing environment 120 in which a plurality of encoders and decoders of the present disclosure are implemented. As shown in FIG. 1, the computing environment 120 includes a source device 130, a storage device 140, and a destination device 150. The source device 103 and the destination device 150 may be any of a wide range of devices, including user computing devices such as desktop computers, laptop computers, tablet computers, set-top boxes, smartphones, televisions, cameras, display devices, digital media players, video gaming consoles, video streaming device, or the like, and/or other physical or virtual servers implemented on a hosted computing network (sometimes known as a "cloud" provider network). In some cases, the source device 130 and the destination device 150 may be equipped for wireless communication. Although illustrated as separate devices, two or all of the source device 130, storage device 140, and destination device 150 may be implemented on a single physical device.

As used herein, the term "coder" refers generically to both image encoders and image decoders. Also, the terms "image coding" or "coding" may refer generically to image encoding and image decoding. In addition to image coding, the aspects described in the present disclosure can be extended to other applications such as video coding.

The source device 130 includes an image source 132, an encoder 134, an encoder 136A, a decoder 136B, and an output interface 138. In some cases, the output interface 138 may include a modulator/demodulator (modem) and/or a transmitter. In the source device 130, the image source 132 may include a source such as an image capture device, e.g., a digital camera, an image/video archive containing previously captured images, an image/video feed interface to receive image/image data from an image/video content provider, and/or a computer graphics system for generating computer graphics data as the source image/video, or a combination of such sources. As one example, if the image source 132 is a digital camera, the source device 130 and the destination device 150 may be part of the same smartphone. However, the techniques described in the present disclosure may be applicable to image coding in general, and may be applied to wireless and/or wired applications.

The captured, pre-captured, or computer-generated images may be encoded by the encoder 134, the encoder 136A, the decoder 136B, or a combination thereof. The encoded image data may be transmitted directly to the destination device 150 via the output interface 138 of the source device 130. Additionally or alternatively, the encoded image data may be stored onto the storage device 140 for later access by the destination device 150 or other devices, for decoding and/or display.

The storage device 130 may store the encoded image data that is outputted from the output interface 138. The encoded image data stored in the storage device 140 may be accessed from the storage device 140 by the input interface 152. The storage device 140 may include any of a variety of distributed or locally accessed data storage media such as a hard drive, flash memory, volatile or non-volatile memory, or any other suitable digital storage media for storing encoded image data. In a further example, the storage device 140 may correspond to a file server or another intermediate storage device that may hold the encoded image generated by the source device 130. The destination device 150 may access stored encoded image data from the storage device 140 via streaming or download. The file server may be any type of server capable of storing encoded image data and transmitting that encoded image data to the destination device 150. Example file servers include a web server (e.g., for a website), an FTP server, network attached storage (NAS) devices, a hosted storage service, or a local disk drive. The destination device 150 may access the encoded image data through any standard data connection, including an Internet connection. This may include a wireless channel (e.g., a Wi-Fi connection), a wired connection (e.g., DSL, cable modem, etc.), or a combination of both that is suitable for accessing encoded image data stored on the storage device 140. The transmission of encoded image data from the storage device 140 may be a streaming transmission, a download transmission, or a combination of both.

The destination device 150 includes an input interface 152, a decoder 154, a decoder 156, and a display device 158. In some cases, the input interface 152 may include a receiver and/or a modem. The input interface 152 of the destination device 150 may receive the encoded image data over a network from the source device 130. The encoded image data may include one or more bit strings generated by the encoder 134, the encoder 136A, and/or the decoder 136B of the source device 130 for use by the decoder 154 and/or the decoder 156 in decoding the image data.

The display device 158 may be integrated with, or external to, the destination device 150. In some examples, the destination device 150 may include an integrated display device and also be configured to interface with an external display device. In other examples, the destination device 150 may be a display device. In general, the display device 158 displays, to a user, a reconstructed version of the originally encoded image based on the decoded image data received from the source device 130 or the storage device 140, and may comprise any of a variety of display devices such as a liquid crystal display (LCD), a plasma display, an organic light emitting diode (OLED) display, or another type of display device.

The encoders and decoders shown in FIG. 1 may each be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of the present disclosure. Each of the encoders and/or decoders may be integrated as part of a combined encoder/decoder (CODEC) in a source device, a destination device, or both.

Although not shown in FIG. 1, in addition to, or instead of, the storage device 104, the computing environment 120 may include a network over which image compression data (e.g., coded bit strings) is communicated from the source device 130 to the destination device 150. Such a network can include any appropriate network, including an intranet, the Internet, a cellular network, a local area network or any other such network or combination thereof. Protocols and components for communicating via the Internet or any of the other aforementioned types of communication networks are known to those skilled in the art of computer communications and thus, need not be described in more detail herein.

Overview of Image Compression Techniques

As will be described in further detail below, the disclosed technology is a trained image compression system using two or more machine learning hierarchical encoders/decoders. The first hierarchy operates to identify salient/non-salient regions in an image and to quantize the image so that non-salient regions of the image are encoded with a fewer number of bits (e.g., more loss) than the salient regions. The output of a quantizer in the first hierarchy is fed as an input to a second hierarchy that further identifies additional important/non-important regions within the previously identified regions and does further quantization to reduce the number of bits used to represent the further identified non-important regions. An arithmetic coder of the first hierarchy receives an output of an arithmetic decoder in the second hierarchy so that the arithmetic coder in the first hierarchy knows what the second hierarchy has done with the quantization. The information provided by the second hierarchy to the first hierarchy may be referred to herein as additional compression information. The additional compression information determined by the second hierarchy and provided to the first hierarchy can be used by the first hierarchy to further compress the image and improve the compression performance (e.g., compared to compressing the image using the first hierarchy alone). In one embodiment, bit strings from each hierarchy are used to store the compressed image. In one embodiment, arithmetic decoders for each hierarchy are used to re-create the input image. In some embodiments, the compressed image can be stored using the bit string of the arithmetic code of the first hierarchy only.

The system can be explained with reference to an image of a horse standing in a field of grass under a cloudless sky. The horse is wearing a saddle with an insignia of a monarch on it. In this example, the horse is more salient than the (repetitive textured) grass or sky. The model described herein, based on a saliency mask, identifies the salient/non-salient regions of the image. Based on this, the system allocates a fewer number of bits to non-salient regions (e.g., the grass and sky) and a greater number of bits to salient regions (e.g., the horse). Similarly, the model, based on an importance mask, can also identify the important/non-important regions of the image, and allocate a fewer number of bits to non-important regions and a greater number of bits to important regions. In some implementations, the salient regions are different from the important regions. However, in other implementations, the salient regions may overlap with the important regions or be identical to the important regions. Accordingly, the first hierarchy of the model identifies the horse as more salient than the grass or sky and encodes the portion of the image for the horse with a greater number of bits than the portion of the image for the grass or sky. This first level of quantization is then fed to the second hierarchy of the model. The second hierarchy further compresses the non-salient regions. Even without explicitly incorporating a saliency mask into the second hierarchy (although it is possible to add explicit saliency masking in the second hierarchy in some implementations), some saliency information flows from first hierarchy to the second hierarchy. Also in the second hierarchy, the mask from the first hierarchy encoder is incorporated. Accordingly, the second hierarchy compresses regions which were missed by the first hierarchy. Thus, in some implementations, the second hierarchy contributes about 6-7% more compression than the first hierarchy alone.

Referring again to the example image of the horse, because some areas of the image are further compressed in the second hierarchy, the output of the second hierarchy may be fed into the arithmetic coder for the first hierarchy. Accordingly, the arithmetic coder of the first hierarchy can see that certain regions of the image further identified as non-salient have been compressed even further (e.g., represented with a fewer number of bits) in order to generate a bit string that represents the compressed image. For example, within the regions of the image representing the horse, the second hierarchy may identify the writing on the insignia on the saddle to be more important than the background of the insignia. In such an example, the first hierarchy may have identified the background of the insignia to be salient, but the second hierarchy may then identify the background of the insignia to be non-important (or less important) and allow the regions of the image corresponding to the background of the insignia to be further compressed.

As may be appreciated, the compressed image could be represented only by the output of the arithmetic coder of the first hierarchy. However, in one embodiment, bit strings produced by both hierarchies are used to represent the compressed image.

Although the disclosed embodiment uses a machine learning model with two hierarchies, it will be appreciated that the system could have further additional hierarchies that each further identify and quantize salient/non-salient regions. Beyond a certain number of hierarchies, adding additional hierarchies could yield minimal additional compression.

In some embodiments, the disclosed technology also includes a loss function that is used to train the models that better represents how human viewers compare compressed versus original uncompressed images.

Technical Details of Image Compression Techniques

A new end-to-end trainable model is disclosed for lossy image compression which includes a number of novel components. Compression of images could be lossless that is, the original image can be perfectly reconstructed (e.g., PNG images). But a lower compression rate may be obtained by using lossy methods such as JPEG, JPEG-2000, and BPG codecs. The objective of these lossy methods is to obtain higher compression by removing the information which is least noticeable (or less noticeable) to humans or non-salient. These traditional codecs are hand-crafted and are not learned/trained using data.

In the present disclosure, a lossy image compression codec is learned directly from data based on a machine learning approach. The system trains the encoder, decoder, and other novel components all together (as opposed to training each component independently). Once the codec is learned, it can be used to compress images in a lossy manner similar to JPEG. In some cases, the encoder and the decoder can be used separately. The techniques described herein incorporate one or more of the following aspects:

Hierarchical Auto-Regressive Model—Embodiments of the present disclosure compress image data in stages. For example, a working 2-stage approach is described herein. However, it is possible to add more stages. Adding multiple stages may help the model compress the image even further and reduce the number of bits used to code the image even further, compared to having a single stage encoder-decoder;

Saliency Masking—Embodiments of the present disclosure incorporate saliency in the images and focus on reconstructing the salient regions better. Humans when looking at images pay more attention to salient regions (e.g., regions which have some objects, text, etc.) than those regions which have repetitive patterns (e.g., sky, water, etc.). Based on the approach described herein, these salient regions are determined (see FIG. 3B below) and a fewer number of bits are allocated to the non-salient regions and a greater number of bits are allocated to the salient regions; and Perceptual Metric—Popularly used evaluation metrics such as multi-scale structural similarity (MS-SSIM) index and peak signal-to-noise ratio (PSNR) may be inadequate for judging the performance of deep learned image compression techniques as they do not align well with human perceptual similarity. Embodiments of the present disclosure utilize an alternative metric, which is trained on perceptual similarity data specific to image compression (see FIG. 2B below). The implementations described herein produce some of the best results when humans evaluate the images generated according to the aspects of the present disclosure than other methods (see FIG. 7), even though traditional metrics such as MS-SSIM and PSNR may indicate otherwise.

The image compression techniques of the present disclosure are described in greater detail below with reference to FIGS. 2A-7.

Example Compressed Images

Figure 2A:
FIG. 2A depicts examples of images having different levels of clarity in accordance with aspects of the present disclosure.
Figure 2A:
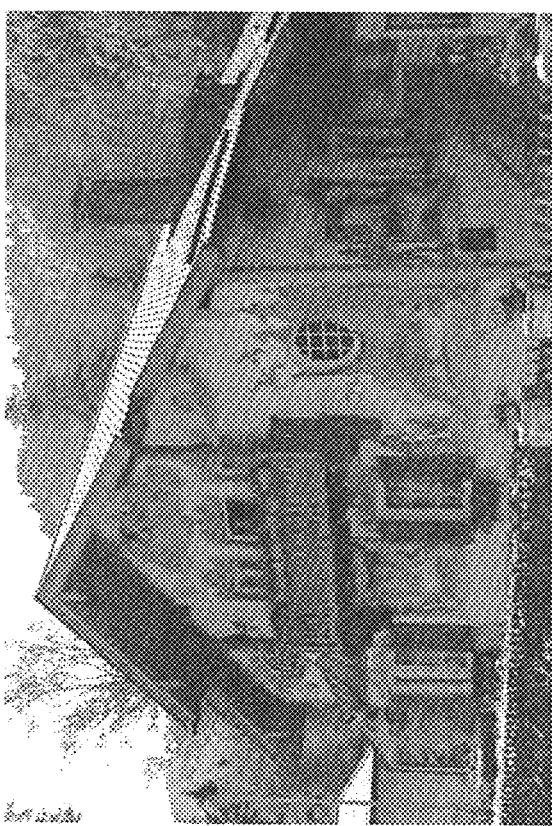

FIG. 2A depicts two different images (A) and (B) that were compressed using two different image compression techniques. Image (A) was compressed using JPEG-2000 and image (B) was compressed using an implementation of the hierarchical auto-regressive image compression techniques described herein. As shown in FIG. 2A, the details of image (B) are more clear compared to the details of image (A) (especially in certain regions of the image such as the wall, balcony, and windows of the house), even though the two images were coded at the same or substantially the same number of bits per pixel (BPP). Although the tree branches at the top left corner of the images appear to be more detailed in image (A) than in image (B), such details may not be as relevant and interesting to the viewer than, for example, the painting on the exterior wall of the house.

Setup for Human Evaluations

A compression specific perceptual similarity dataset may be collected and benchmark the existing handcrafted metrics PSNR and MS-S SIM may be benchmarked along with a Learned Perceptual Image Patch Similarity (LPIPS) metric. The setup for collecting this dataset adapts two alternative forced choices (2AFC). Annotators are presented with two reconstructed versions of the same image from different compression methods along with the original image in the middle. The annotators are asked to pick the image which is closer to the original image. Since at high bit rates the images may be similar to each other, the annotators are provided with a synchronous magnifying glass and requested to scan the images as a whole in case of uncertainties. On average, the evaluators spend 56 seconds on one sample.

The reconstructed images come from the following methods: Mentzer et al., Patel et al., BPG, and JPEG-2000. 200 original images are used, comparisons are made at 4 different bit-rates and all possible combinations of methods are considered (6 for 4 methods). This results in 4,800 total samples for perceptual similarity studies. 3,840 of the samples are used for training and 960 of the samples were held out for testing. For each such sample, 6 evaluations were obtained resulting in a total of 28,800 HITs.

Deep Perceptual Metric

In some implementations, feed-forward is performed on a VGG-16 convolutional neural network (which is trained on images from the ImageNet dataset) for both an original (x) and reconstructed image (X). Let L be the set of layers used for loss calculation (five for the disclosed setup) and, a function F(x) denoting feed-forward on an input image x. F(x) and F(X) return two stacks of feature activation's for all L layers. The deep perceptual loss can then be computed as: F(x) and F(x̂) are unit-normalized in the channel dimension. Let us call these, $z_x^l$, $Z_{\hat{x}}^l \in R^{H_l \times W_l \times C_l}$ where $l \in L$. ($H_l$, $W_l$ are the spatial dimensions).

$z_x^l$, $Z_{\hat{x}}^l$ are scaled channel wise by multiplying with the vector $w^l \in R^{C_l}$.

The $l_2$ distance is then computed and an average over spatial dimensions are taken. Finally, a channel-wise sum is taken, outputting the deep perceptual loss.

Figure 2B:
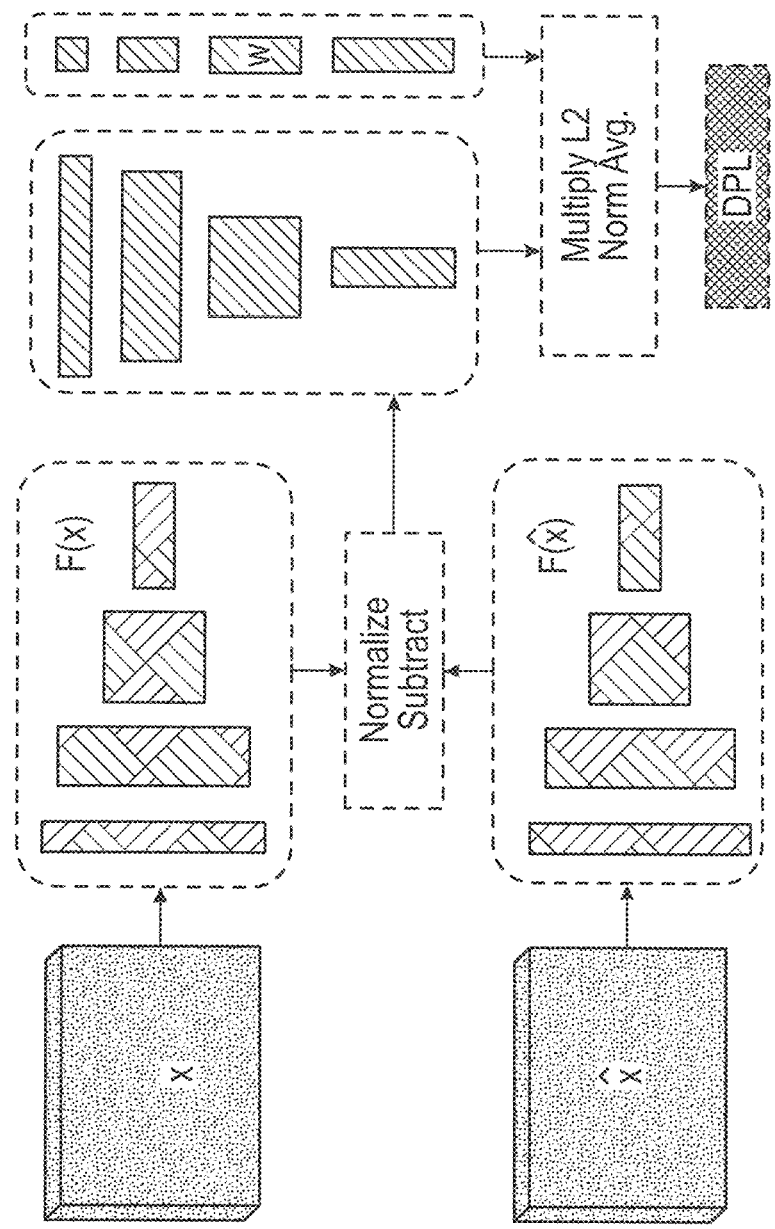
FIG. 2B depicts a block diagram illustrating a deep perceptual loss calculation process in accordance with aspects of the present disclosure.

Equation (1) provided below and FIG. 2B summarize the deep perceptual loss computation. As shown in FIG. 2B, the perceptual similarity distance between the original x and reconstructed x̂ images can be computed by computing the deep embeddings F(x) and F(x̂), normalizing along the channel dimensions, scaling each channel vector w (learned on perceptual similarity dataset), taking the $l_2$ norm, averaging across spatial dimensions, and summing across channels.

The weights in F can be learned for image classification on the ImageNet dataset and may be kept fixed. w are the linear weights learned on top of F on the perceptual similarity dataset using a ranking loss function. The Deep Perceptual Loss (DPL) may be computed as shown below:

$$DPL(x, \hat{x}) = \sum_l \frac{1}{H_l W_l} \sum_{h,w} \|w_l \odot (z_{\hat{x},h,w}^l - z_{x,h,w}^l)\|_2^2 \quad (1)$$

Rate-Distortion and Image Compression

The objective function of any lossy image compression technique may be defined by a rate-distortion trade-off:

$$\min \sum_{x \sim \chi} (\alpha Rate(x) + \beta Distortion(x, \hat{x})) \quad (2)$$

where x is the image to be compressed drawn from a collection of images χ, x̂ is the reconstructed image, Rate(x) is the storage requirement for the image and Distortion(x, x̂) is a measure of distortion between the original and the reconstructed images.

An example image compression system is described in greater detail below with reference to FIGS. 3A and 3B.

Two-Stage Encoder-Decoder System

Figure 3A:
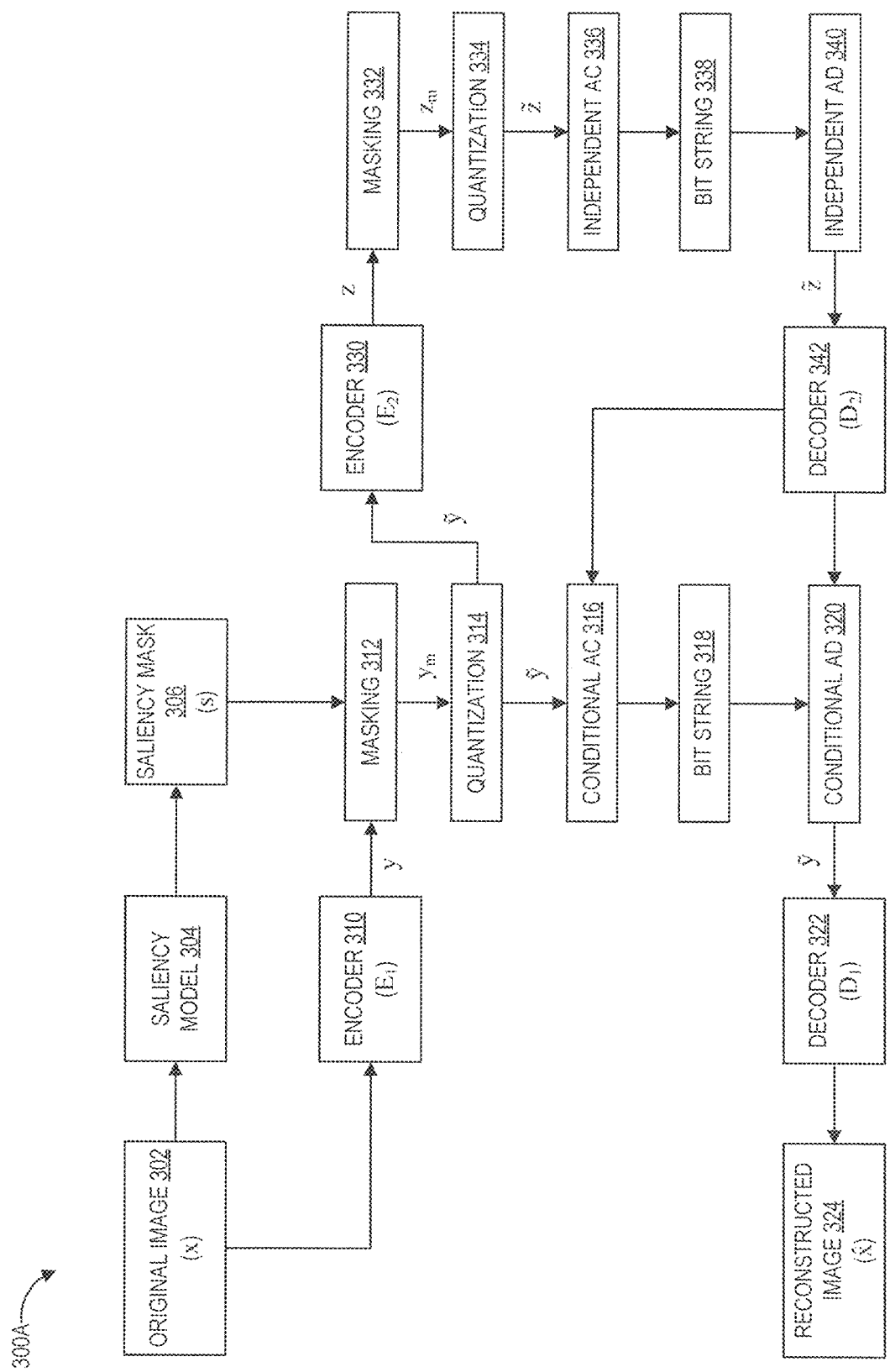
FIG. 3A depicts a block diagram illustrating an image encoding and decoding process in accordance with aspects of the present disclosure.

FIG. 3A depicts a block diagram 300A illustrating image encoding and decoding process in accordance with aspects of the present disclosure. The block diagram 300A begins with an original image 302, which is fed into a saliency model 304 as well as an encoder 310. The saliency model 304 may be a pre-trained neural network that can generate a saliency map for the original image 302. For example, the saliency mask s, where $s_i \in \{0, 1\}$ may be predicted by an off-the-shelf object saliency model. The saliency mask 306 can be used to mask quantized representations of the first stage so that a greater number of bits can be allocated to the salient regions identified by the saliency model 304 and/or the saliency mask 306 than the number of bits allocated to regions not identified by the saliency model 304 and/or the saliency mask 306 as salient regions or regions identified by the saliency model 304 and/or the saliency mask 306 as non-salient regions.

Further, the saliency mask 306 can be used during the computation of distortion loss, so that a higher weight may be given to the reconstruction of the salient regions. For example, weighted distortion loss can be calculated by decomposing the original and reconstructed images into salient and non-salient parts. The saliency masking technique is described in greater detail below with reference to FIG. 3B.

Encoders and Decoders

As shown in FIG. 3A, an image compression system according to the present disclosure may include two or more hierarchies or stages (e.g., two encoders, two decoders, two quantization stages, and two auto-regressive models for entropy estimation), all of which may be trained jointly and in an end-to-end fashion. The first encoder may take the image as input and output latent representation $$y = E_1(x): \mathbb{R}^{W \times H \times 3} \to \mathbb{R}^{\frac{W}{8} \times \frac{H}{8} \times C_1 + 1}.$$

The number of channels in the bottleneck $C_1$ may be one of the hyper-parameters to train the models to obtain different bits-per-pixel values. A pre-trained network outputs the object saliency for the input image $$s = S(x): \mathbb{R}^{W \times H \times 3} \to \mathbb{Z}_2^{\frac{W}{8} \times \frac{H}{8} \times 1}.$$

The latent representations are first masked by saliency driven priors $y_m = m_1(y, s)$ and then quantized $\tilde{y} = Q_1(y_m)$: $\mathbb{R} \to \{c_{(1,1)}, \ldots, c_{(1,L)}\}$ and fed to stage two. Within stage two, the second encoder outputs the latent representations $$z = E_2(\tilde{y}): \mathbb{R}^{\frac{W}{8} \times \frac{H}{8} \times C_1} \to \mathbb{R}^{\frac{W}{32} \times \frac{H}{32} \times C_2 + 1}$$

which are also masked $z_m = m_2(z)$ (independent of saliency) and quantized with different centers $\tilde{z} = Q_2(z_m): \mathbb{R} \to \{c_{(2,1)}, \ldots, c_{(2,L)}\}$.

An auto-regressive image compression model operating on a quantized latent representation factorizes the discrete representation using a basic chain rule:

$$P(\tilde{y}) = \prod_{i=1}^{N} p(\tilde{y}_i | \tilde{y}_{i-1}, \ldots, \tilde{y}_1) \quad (3)$$

An extra set of auxiliary representations 2 may be jointly learned to factorize joint distribution using:

$$P(\tilde{y}, \tilde{z}) = P_\Theta(\tilde{y}|\tilde{z}) P_\Phi(\tilde{z}) \quad (4)$$

Here, $\Theta$ and $\Phi$ are the parameters of two 3D Pixel-CNN model where $P(\tilde{z})$ is the second stage (e.g., elements 330-342 in FIG. 3A) which is decoded first during the decompression stage. Thus, for the first stage (e.g., elements 310-322 in FIG. 3A), quantized representations $\tilde{y}$ are encoded and decoded by assuming that the set of auxiliary representations 2 is available. The first stage and the second stage may also be referred to herein as the first hierarchy and the second hierarchy, respectively.

As shown in FIG. 3A, the encoder 310 takes the original image 302 as input and outputs latent representations y, which are first masked by the masking module 312 to produce masked representations $y_m$, which are quantized by the quantization module 314 to produce quantized representations $\tilde{y}$, which are then fed to stage two (e.g., encoder 330 of the second stage). Quantization generally refers to a process in which the representations described above are quantized to possibly reduce the amount of data used to represent the representations, providing further compression. The quantization process may reduce the bit depth associated with some or all of the representations. For example, an n-bit representation may be rounded down to an m-bit representation during quantization, where n is greater than m.

Within stage two, the encoder 330 outputs the latent representations z, which are masked by the masking module 332 to produce $z_m$, which is quantized by the quantization module 334 with different centers to produce auxiliary representations $\tilde{z}$.

The first encoder (e.g., encoder 310) may be a fifteen residual block fully-convolutional network with three non-local/self-attention layers. The first encoder may involve down-sampling of the input image (e.g., the original image 302) by a factor of 8. In one embodiment, the second encoder (e.g., encoder 330) takes the quantized representations $\tilde{y}$ from the first stage as input, feed-forwards through five residual blocks, a non-local layer, and performs a further down-sampling by a factor of 4. $\tilde{z}$ can be W/32×H/32 and fairly small compared to the input x of W×H. For example, the set of auxiliary representations $\tilde{z}$ may be significantly smaller in size than the original image 302, and thus, the number of bits needed to store the second stage bit string 338 may be very low (e.g., 5% of the total storage requirement). The decoders corresponding to these two encoders may be mirror images. For example, in some embodiments, the decoders 332 and 342 are identical to each other. Alternatively, in other embodiments, the decoders 332 and 342 are different from each other.

The number of channels in the bottlenecks $\tilde{y}$ or $\tilde{z}$ may be a hyper-parameter used to control the bits-per-pixel. In some implementations, the number of channels is kept the same for both of these bottlenecks. Both the bottlenecks have an extra channel for a hybrid of a saliency mask and an importance map, which are described in greater detail below.

Quantization

Quantization is a non-differentiable function with gradients being either zero or infinite, thus any deep learned model with quantization cannot be trained using backpropagation. Thus, the soft vector quantization is adapted in the model described herein. More specifically, given a set of cluster centers $C_1 = \{c_1, \ldots c_{L1}\}$ the feed-forward is determined by:

$$\tilde{y}_i = Q_{C_1}(y) = \mathrm{argmin}_j \|y_i - c_j\| \quad (5)$$

During back-propagation, a soft cluster assignment is used:

$$\hat{y}_i = \sum_{j=1}^{L_1} \frac{\exp(-\sigma \|y_i - c_j\|)}{\sum_{l=1}^{L_1} \exp(-\sigma \|y_i - c_l\|)} \quad (6)$$

The quantization process can be the same for both stages but with different sets of centers.

Hierarchical Auto-Regressive Model

In the first stage, the representations of the first stage can be encoded and decoded by conditioning on the second stage and may be fully factorized as:

$$P(\tilde{y}|z) = \prod_{i=1}^{i=N} P(y_i | y_{i-1}, \ldots, D_2(\tilde{z})) \quad (7)$$

The quantized representations of the first stage are lossless compressed using standard arithmetic coding where the conditional probabilities are estimated by a 3D pixel-CNN, which is conditioned on extra auxiliary representations $D_2(\tilde{z})$. The 3D pixel-CNN is trained with cross-entropy minimization for a correct quantized center assignment:

$$P_{i,l}(\tilde{y}) = p_\Theta(\tilde{y}_i = c_l | \tilde{y}_{i-1}, \ldots, \tilde{y}_1, D_2(\tilde{z})) \quad (8)$$

In this example, the total entropy for the bottleneck is estimated using cross-entropy as:

$$CE = H_1(\tilde{y} \mid \tilde{z}) = E_{\tilde{y} \sim P(\tilde{y}|\tilde{z})} \left[ \sum_{i=1}^{i=N} -\log(P_{i,l}(\tilde{y}_i)) \right] \quad (9)$$

In the second stage, the representations of the second stage are encoded independently and the distribution is factorized as a product of conditionals:

$$P(\tilde{z}) = \prod_{i=1}^{i=M} P(\tilde{z}_i \mid \tilde{z}_{i-1}, \ldots, \tilde{z}_1) \quad (10)$$

The second stage uses a separate 3D pixel-CNN, which is trained by minimizing:

$$CE = H_2(\tilde{z}) = E_{\tilde{z} \sim P(\tilde{z})} \left[ \sum_{j=1}^{j=M} -\log(P_{j,l}(\tilde{z}_j)) \right] \quad (11)$$

For example, the second stage may learn the auxiliary features which help in further compressing the first stage representations. Thus, the gradients from the $H_1(\tilde{y}|\tilde{Z})$ equation above are propagated to the second stage along with additional gradients from a reconstruction loss mse($\tilde{y}$, $D_2(\tilde{z})$).

Further, the overall rate optimization Rate(x) incorporates the masks from both stages, that is, $m_1$ and $m_2$ as the weight to the cross-entropy computation for a given index in the bottleneck. The overall entropy is thus given by:

$$\text{Rate}(x) = H = m_1 H_1(\tilde{y}|\tilde{z}) + m_2 H_2(\tilde{z}) \quad (12)$$

As shown in FIG. 3A, a reconstructed image 324 may be generated by the decoder 322 and caused to be displayed on a display device.

Incorporating Object Saliency

The saliency mask s such that $s_i \in \{0, 1\}$ may be predicted by an off-the-shelf object saliency model, which was trained on data from the MSRA10K Salient Object Database. It can be used in the compression model described herein in two ways. Firstly, the saliency mask can be used to mask quantized representations of the first stage, such that a greater number of bits are allocated to the salient regions than to the non-salient regions. Secondly, during the computation of distortion loss, the saliency mask can be used to give higher weight to the reconstruction of the salient regions.

The generated saliency mask can be combined with an importance mask which helps in navigating the bit-rate convergence to a certain target value. The last channel of the bottleneck is treated as the importance mask $i = E_1(x)[C_1]$. This importance mask is linearly combined with the saliency mask s to make the compression driven by saliency.

Figure 3B:
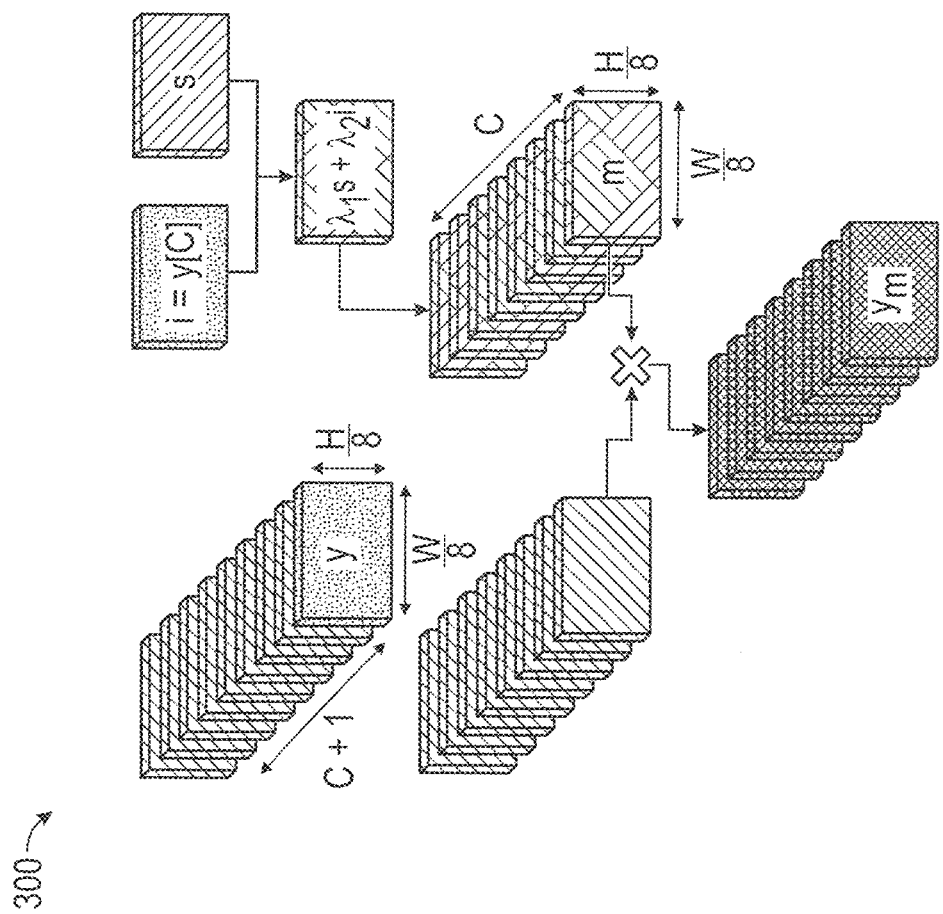
FIG. 3B depicts a block diagram illustrating a saliency masking and importance masking process in accordance with aspects of the present disclosure.

FIG. 3B illustrates an example saliency masking and importance masking process used in stage one. In this example, the last channel i=y[C] of the C+1 channels outputted by the encoder 310 is used as the importance mask. Although the saliency mask s is combined with the importance mask i in the example of FIG. 3B, in other examples, the saliency mask s may be omitted, and only the importance mask i may be used. As another example, the masking in the first stage may use a combination of an importance mask and a saliency mask, and the masking in the second stage may use just an importance mask. In such an example, the importance mask used in the second stage may be different than the importance mask used in the first stage.

As illustrated by a diagram 300B of FIG. 3B, the final mask used may be given by $m_1 = \lambda_1 s + \lambda_2 i$. In some implementations, $\lambda_1 = \lambda_2 = 1$ is used so that the model is able to incorporate saliency while at the same time is able to converge to a specified target bit-rate value.

This two-dimensional mask is expanded to match the dimensionality of the bottleneck as follows:

$$m_1: m_{i,j,k} = \begin{cases} 1 & \text{if } k < y_{i,j} \\ (y_{i,j} - k) & \text{if } k \leq y_{i,j} \leq k+1 \\ 0 & \text{if } k+1 > y_{i,j} \end{cases} \quad (13)$$

Finally, the bottleneck is masked by a pointwise multiplication with the binarization of $m_1$ as $y_m = y \odot \lceil m_1 \rceil$.

Humans in general pay more attention to salient regions in an image. Thus, during training, higher priority may be given to the reconstruction of these salient regions. This is achieved by decomposing the original and reconstructed images into salient and non-salient parts. Here, weighted distortion loss is computed on both separately and then linearly combined as:

$$w_1 D(x \odot s, \tilde{x} \odot s) + w_2 D(x \odot (1-s), \tilde{x} \odot (1-s)) \quad (14)$$

where w1>w2. In some implementations, $w_1 = 0.75$ and $w_2 = 0.25$.

Model Optimization

The overall optimization may be the rate-distortion trade-off illustrated by Equation (2). The rate may be determined by Equation (12), and the distortion may be saliency-driven and governed by Equation (14) where the distortion function D is a linear combination of the deep perceptual loss DPL from Equation (1) and the mean-squared error between the original and the reconstructed images.

In some implementations, the model optimization may be performed using a specialized gradient-descent algorithm, known as the Adam optimizer, with an initial learning rate of $4 \times 10^{-3}$ and a batch size of 30. Here, the learning rate is decayed by a factor of 10 in every two epochs (step-decay). Further, the rate term is clipped to max(t, βR) to make the model converge to a certain bit-rate, t. The training is done on the training set of ImageNet dataset from Large Scale Visual Recognition Challenge 2012 (ILSVRC2012), and with the mentioned setup, convergence is observed in six epochs.

By varying the model hyper-parameters, such as the number of channels in the bottlenecks (that is $C_1$ and $C_2$), the weight for distortion loss (α), and the target bit-rate (t), multiple models are obtained in the bit-per-pixel range of 0.15 to 1.0. Similarly, the models are reproduced at different BPP values. In some implementations, an MS-SSIM loss can be used instead of mean squared error (MSE) loss. Example human evaluations of images on the Kodak image dataset are described below with reference to FIG. 7.

Example Image Encoding Routine Using Secondary Hierarchy

Figure 4:
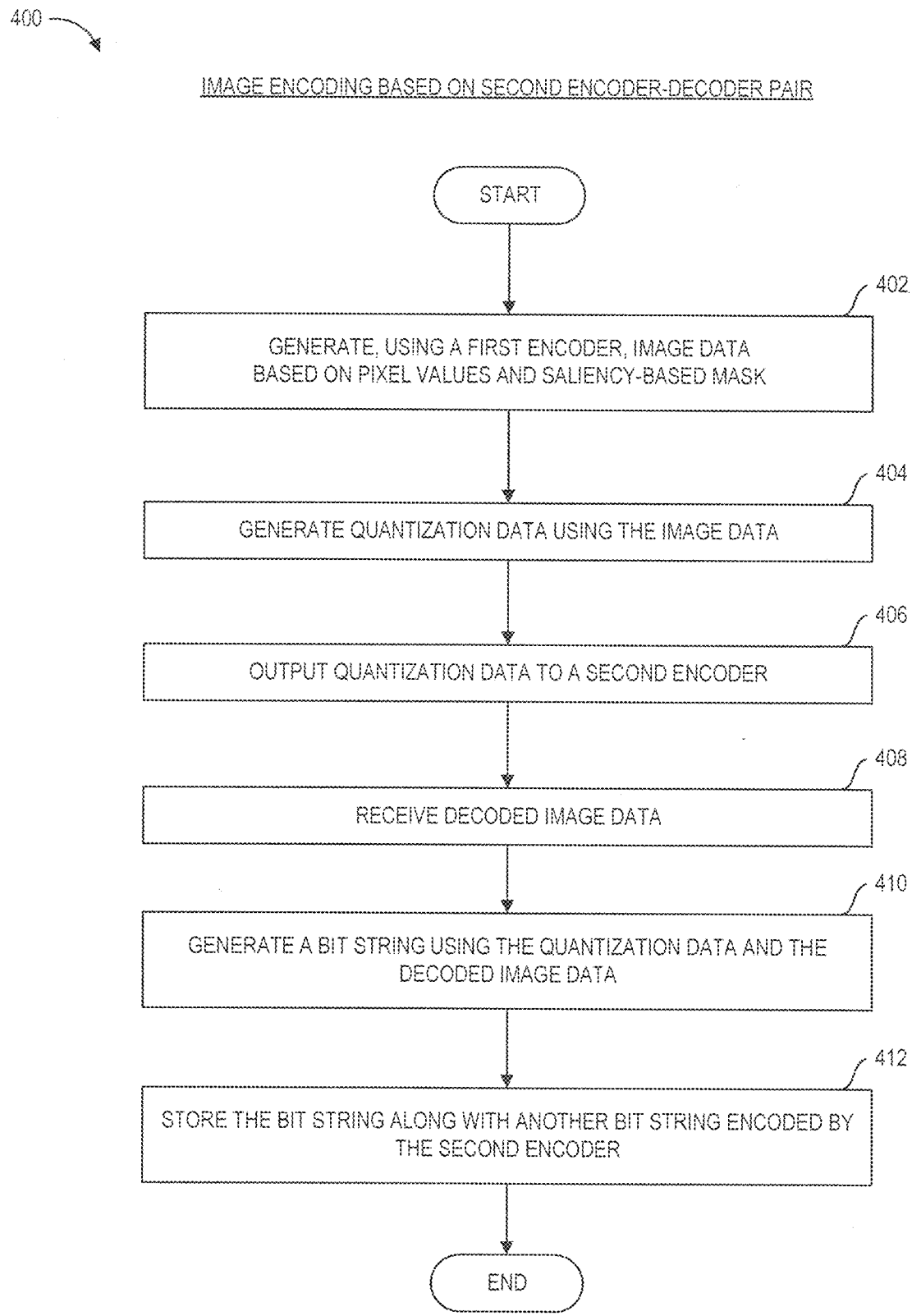
FIG. 4 is a flowchart of an example process for encoding an image in accordance with aspects of the present disclosure.

FIG. 4 depicts an illustrative routine 400 for encoding an image in accordance with aspects of the present disclosure. The routine 400 may be carried out, for example, by the source device 130, the destination device 150, or one or more components thereof. For convenience, the steps of routine 400 are described as being performed by an image compression system. For example, such an image compression system may include one or more hardware computing devices and non-transitory physical computer storage storing instructions that, when executed by the one or more hardware computing devices, cause the one or more hardware computing devices to perform the steps of the routine 400. As another example, such an image compression system may include hardware circuitry configured to perform the steps of the routine 400.

The routine 400 begins at 402, where the image compression system generates, using a first hierarchy (or first stage) of a trained image compression network, image data associated an original image based at least on one or more pixel values of the original image and a saliency-based mask indicating one or more regions of interest in the original image that are of greater importance (e.g., to a potential viewer) than another region in the original image. In the implementation illustrated in FIG. 3A, the encoder 310 generates a plurality of channels based on the pixel data included in the original image 302. The plurality of channels are multiplied with the saliency-based mask 306 generated by a saliency model that is configured to analyze an image and identify one or more regions of interest (e.g., human faces or objects in the foreground) in the image. The pixels (or other types of values such as tensors, vectors, and/or transform parameters arranged in a data structure) in the original image may be filtered and/or weighted using the saliency-based mask, and the resulting output may sometimes be referred to herein as image data or image compression data of the original image 302.

At block 404, the image compression system generates quantization data using the image data generated at block 402. For example, the quantization data may be generated by the quantization module 314 as described with reference to FIG. 3A. The quantization data is also referred to herein as a first quantized image.

At block 406, the image compression system outputs the quantization data to an encoder (e.g., encoder 330) of a second hierarchy (or second stage). In the implementation illustrated in FIG. 3A, using the quantization data, the encoder 330 generates latent representations (also referred to herein as channels), the masking module 332 generates masked representations using the latent representations, the quantization module 334 generates quantized representations using the masked representations (also referred to herein as a second quantized image), and the independent AC 336 generates the bit string 338 using the quantized representations. The bit string 338 may be decoded (e.g., by the independent AD 340 and the decoder 342) and provided to the first stage of the image compression system.

At block 408, the image compression system receives decoded image data from a decoder (e.g., decoder 342) of the second hierarchy. In some implementations, the decoded image data (also referred to herein as additional compression information) indicates the additional compression performed by the second hierarchy. For example, the additional compression information may indicate one or more bits or pieces of the original image (or the quantized image provided to the encoder 330) that have been removed or omitted by one or more of the components in the second hierarchy. Alternatively or additionally, the additional compression information may indicate one or more bits or pieces of the original image (or the quantized image provided to the encoder 330) that have been determined to be important by the second hierarchy (and thus kept from the quantization data provided to the second hierarchy). In some implementations, over 90% of the compression is performed by the first stage, and the remaining compression is performed by the second stage.

At block 410, the image compression system generates a bit string using the quantization data generated at block 404 and the decoded image data received from the decoder of the second hierarchy at block 408. For example, the quantization data received from the quantization module 314 may indicate the regions of the image determined by the first hierarchy to be salient/non-salient and/or important/non-important, and the additional compression information received from the second hierarchy may indicate any additional regions of the image determined by the second hierarchy to be important/non-important. If a region determined to be important by the first hierarchy is subsequently determined to be non-important by the second hierarchy, the image compression system may use a fewer number of bits to encode such region.

In the example of FIG. 3A, in order to determine how to encode the bit string 318 based on the quantization data from the quantization module 314 and the additional compression information from the decoder 342 (e.g., which portions of the quantization data to use, which portions of the additional compression information to use, etc.), the conditional AC 316 uses a weighted loss function (e.g., the function illustrated in Equation (14)). For example, the weighted loss function penalizes distortion in the salient region of the image to a greater extent than distortion in the non-salient region of the image. In the example of FIG. 3A, the conditional AC 316 encodes the bit string 318 in a manner that minimizes the weighted loss function. In one embodiment, the conditional encoder is trained to produce a bit stream to represent an image by selectively combining the bit stream from the first hierarchy or the bit stream from the second hierarchy in order to minimize a loss function that takes into account both the number of bits used for encoding and distortion in salient/important portions of the image.

At block 412, the image compression system stores the bit string (e.g. as bit string 318) along with another bit string encoded by the encoder of the second hierarchy (e.g., bit string 338). In some implementations, based on the decoded image data received from the second hierarchy, the first hierarchy refrains from storing information (e.g., in the bit string 318) that is (or should be) stored by the second hierarchy (e.g., as the bit string 338). The two bit strings may be stored as two separate files. Alternatively, the two bit strings may be stored as part of the same file, and the pointer to each of the bit strings may be maintained. The routine 400 may then end.

Example Image Decoding Routine Using Secondary Hierarchy

Figure 5:
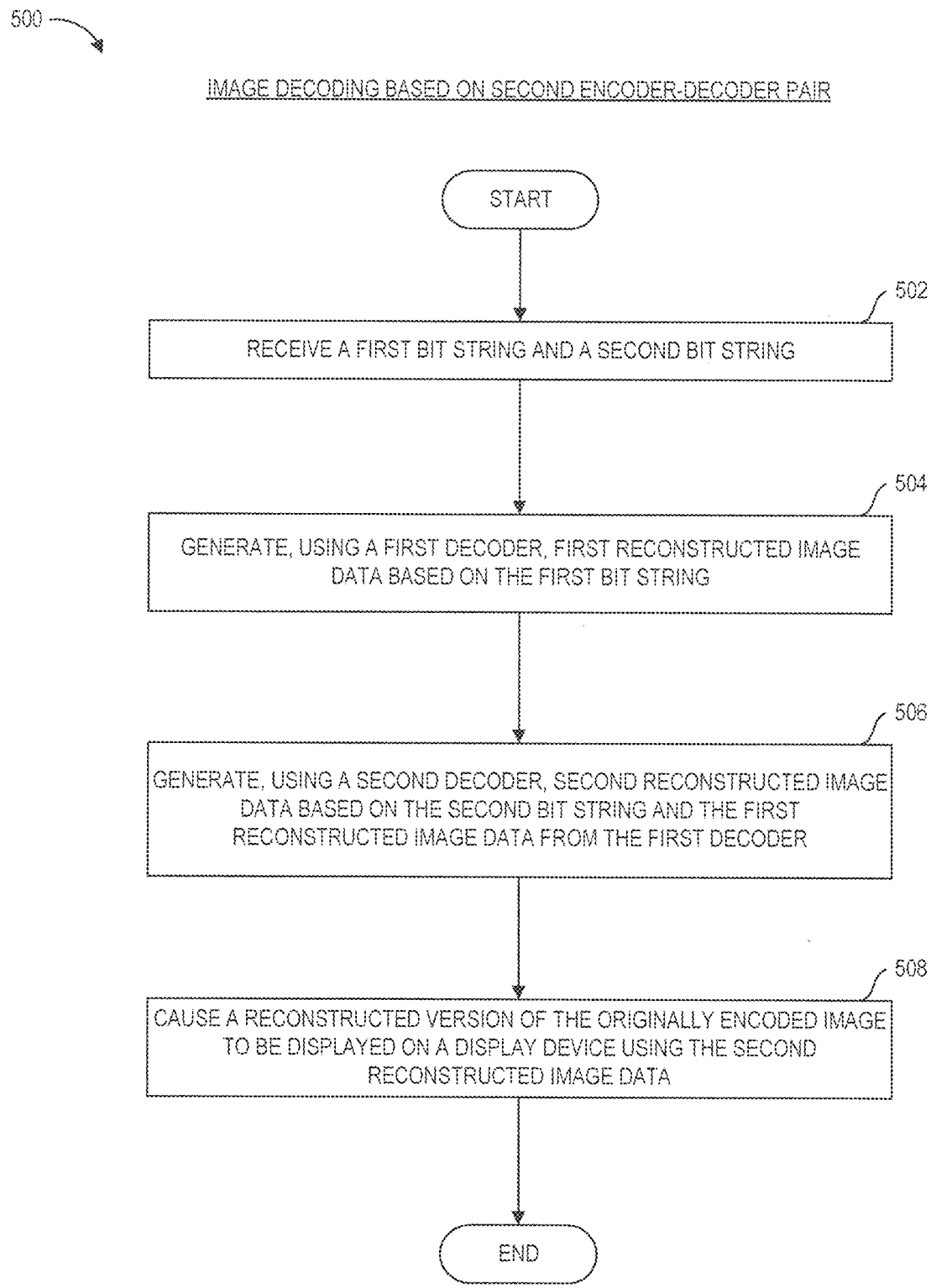
FIG. 5 is a flowchart of an example process for decoding an image in accordance with aspects of the present disclosure.

FIG. 5 depicts an illustrative routine 500 for decoding an image in accordance with aspects of the present disclosure. The routine 500 may be carried out, for example, by the source device 130, the destination device 150, or one or more components thereof. For convenience, the steps of routine 500 are described as being performed by an image compression system. For example, such an image compression system may include one or more hardware computing devices and non-transitory physical computer storage storing instructions that, when executed by the one or more hardware computing devices, cause the one or more hardware computing devices to perform the steps of the routine 500. As another example, such an image compression system may include hardware circuitry configured to perform the steps of the routine 500.

The routine 500 begins at 502, where the image compression system receives a first bit string (e.g., bit string 338) and a second bit string (e.g., bit string 318) usable to generate a reconstructed version of an original image. For example, the first bit string may be the encoded bits generated in the second stage (e.g., by elements 330-336) of the image compression system, and the second bit string may be the encoded bits generated in the first stage (e.g., by elements 310-316) of the image compression system.

At block 504, the image compression system generates, using a decoder (e.g., decoder 342) in the second stage, first reconstructed image data based on the first bit string. For example, the image compression system may access the bit string 338, decode the bits included in the bit string 338 using the independent AD 340 and the decoder 342.

At block 506, the image compression system generates, using a decoder (e.g., decoder 322) of the first stage, second reconstructed image data based on the second bit string and the first reconstructed image data generated by the decoder of the second stage at block 504. For example, the image compression system may access the bit string 318 and decode the bits included in the bit string 318 at the conditional AD 320, which may use the first reconstructed image data generated by the second stage based on the bit string 338.

In the example of FIG. 3A, the conditional AD 320 combines the information included in the bit string 318 and the information included in the bit string 338, based on the manner in which the conditional AC 316 encoded the bit string 318 in the first place based on the quantization data received from the quantization module 314 and the decoded image data received from the decoder 342. For example, if the conditional AC 316 refrained from including certain information in the bit string 318 based on a determination that such information would be included in the bit string 338, the conditional AD 320 would look for the information in the first reconstructed image data received from the decoder 342 and include the information in the data provided to the decoder 322. For example, the conditional AC 316 encodes the bit string 318 using the weighted loss function as described above, and the conditional AD 320 decodes the bit string 318 by undoing, using the additional compression information from the second stage, the steps the conditional AC 316 performed to encode the bit string 318.

At block 508, the image compression system causes a reconstructed version of the originally encoded image (e.g., the original image represented by the first bit string and the second bit string) to be displayed on a display device using the second reconstructed image data generated at block 506. For example, the image compression system may be a smartphone having a display, and the image compression system may generate the reconstructed image 324, which is a version of the original image 302 that is generated based on the bit strings 318 and 338, and cause the reconstructed image 324 to be displayed on the display of the smartphone. The routine 500 may then end.

Example Architecture of Image Compression System

Figure 6:
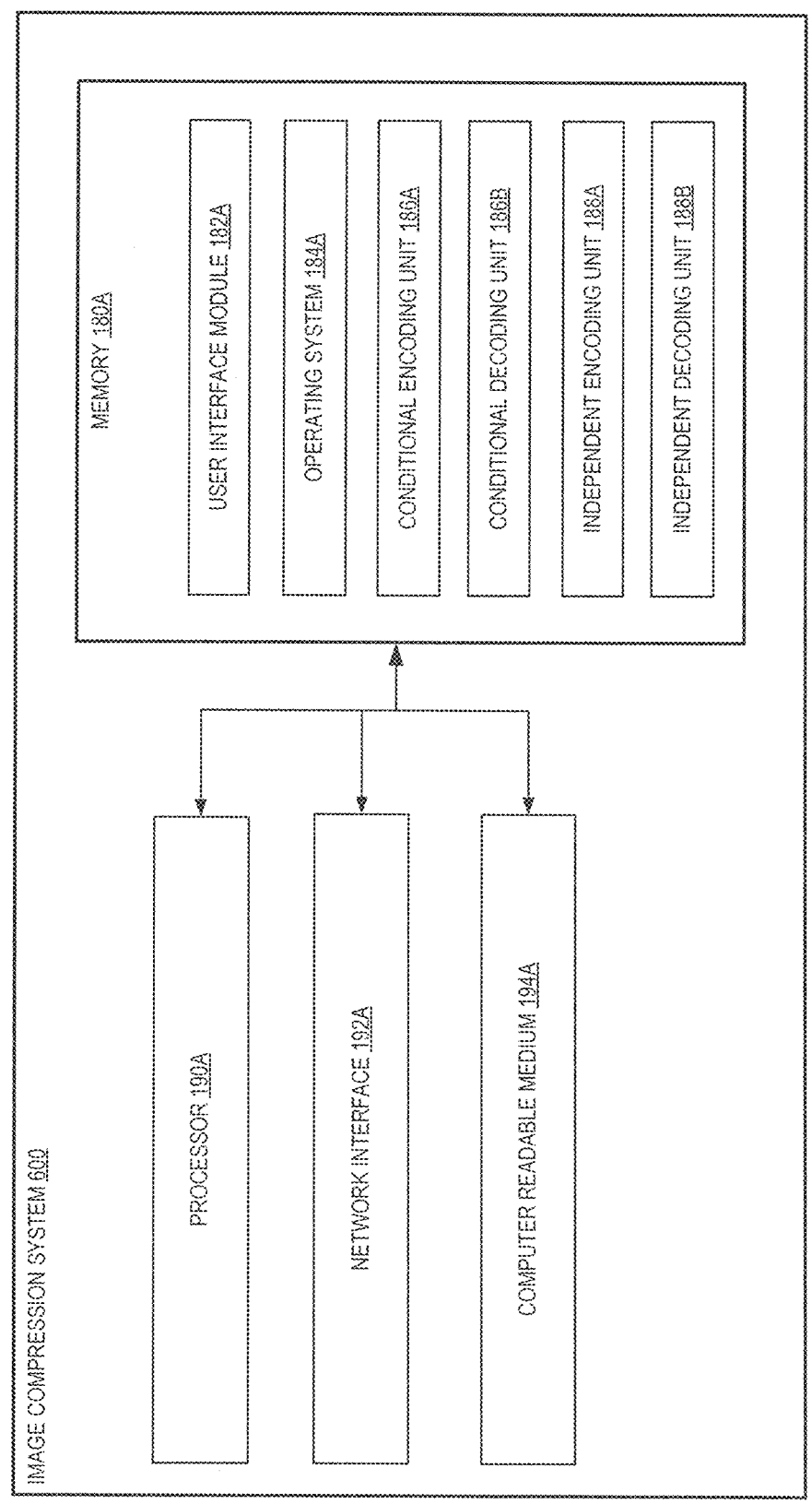
FIG. 6 depicts a general architecture of a computing device or system implementing one or more techniques in accordance with aspects of the present disclosure.

FIG. 6 depicts an example architecture of a computing system (referred to as the image compression system 600) that can be used to perform one or more of the techniques described herein or illustrated in FIGS. 1-5. The general architecture of the image compression system 600 depicted in FIG. 6 includes an arrangement of computer hardware and software modules that may be used to implement one or more aspects of the present disclosure. The image compression system 600 may include many more (or fewer) elements than those shown in FIG. 6. It is not necessary, however, that all of these elements be shown in order to provide an enabling disclosure. As illustrated, the image compression system 600 includes a processor 190A, a network interface 192A, and a computer readable medium 194A, all of which may communicate with one another by way of a communication bus. The network interface 192A may provide connectivity to one or more networks or computing systems. The processor 190A may thus receive information and instructions from other computing systems or services via a network described herein.

The processor 190A may also communicate with memory 180A. The memory 180A may contain computer program instructions (grouped as modules in some embodiments) that the processor 190A executes in order to implement one or more aspects of the present disclosure. The memory 180A may include RAM, ROM, and/or other persistent, auxiliary, or non-transitory computer-readable media. The memory 180A may store an operating system 184A that provides computer program instructions for use by the processor 190A in the general administration and operation of the image compression system 600. The memory 180A may further include computer program instructions and other information for implementing one or more aspects of the present disclosure. For example, in one embodiment, the memory 180A includes a user interface module 182A that generates user interfaces (and/or instructions therefor) for display upon a user computing device described herein, e.g., via a navigation and/or browsing interface such as a browser or application installed on the user computing device. In addition, the memory 180A may include or communicate with one or more data stores.

In addition to and/or in combination with the user interface module 182A, the memory 180A may include a conditional encoding unit 186A, a conditional decoding unit 186B, an independent encoding unit 188A, and an independent decoding unit 188B that may be executed by the processor 190A. The conditional encoding unit 186A may implement one or more of the techniques described herein as being performed by the encoder 134 and the encoder 310, the conditional decoding unit 186B may implement one or more of the techniques described herein as being performed by the decoder 154 and the decoder 322, the independent encoding unit 188A may implement one or more of the techniques described herein as being performed by the encoder 136A and the encoder 330, and the independent decoding unit 188B may implement one or more of the techniques described herein as being performed by the decoder 136B, the decoder 156, and the decoder 342. Although FIGS. 3A, 3B, and 6 illustrate only one conditional hierarchy (e.g., encoder 310 and decoder 322), the image compression system 600 may include any number of additional conditional hierarchies (e.g., a first hierarchy that depends on the output of a second hierarchy, which depends on the output of a third hierarchy, and so on).

In some embodiments, the image compression system 600 is implemented by a user computing device described herein, such as a smartphone, that can capture, encode, and store images for subsequent transmission and/or display. In other embodiments, the image compression system 600 is implemented by a physical or virtual server on a hosted computing network (sometimes known as a "cloud" provider network) that can receive, encode, and store images (e.g., on behalf of its users) and transmit compressed images (e.g., encoded bit strings) to one or more user computing devices to be decoded and displayed on the user computing devices.

Results

Figure 7:
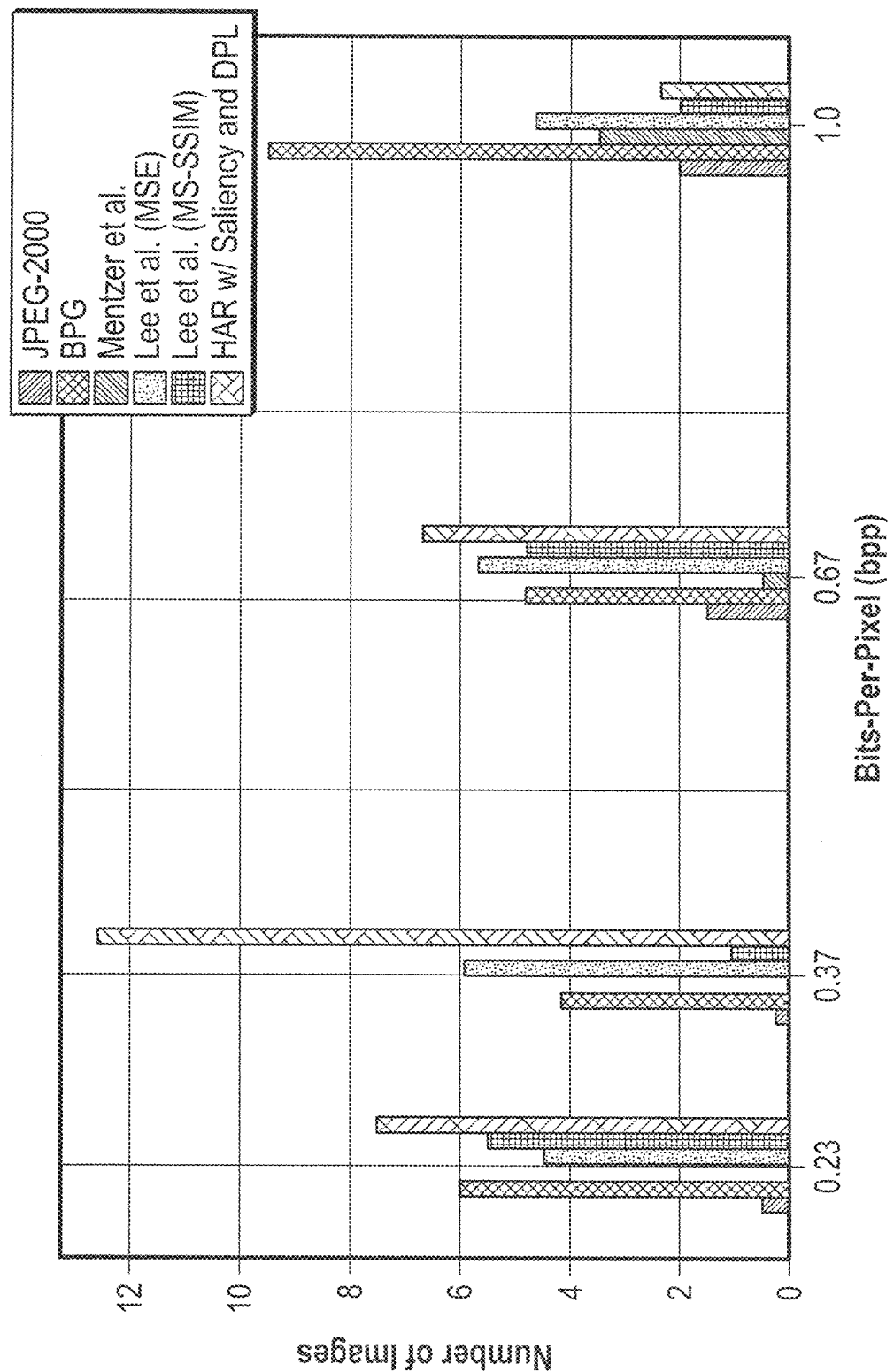
FIG. 7 depicts illustrates the results of human evaluations of images compressed and reconstructed in accordance with aspects of the present disclosure.

FIG. 7 illustrates the results of human evaluations on the Kodak image dataset. The y-axis shows the number of images for which a given method performs best. The x-axis shows the BPP values at which the comparisons were performed. As shown in FIG. 7, the technique described herein is best according to the human evaluation across at least three bit-rate values (0.23, 0.37, 0.67).

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system for compressing images comprising:
   a memory for storing program instructions;
   a processor configured to execute the program instructions to at least:
      receive an image to be compressed; and
      cause the image to be compressed by a trained image compression network having at least a first hierarchy and a second hierarchy,
   wherein the first hierarchy includes at least:
      a first encoder configured to convert the image into a first set of channels;
      a first masking function configured to identify a salient region and a non-salient region in the image;
      a first quantizer configured to generate a first quantized image using a fewer number of bits to represent the non-salient region than a number of bits used to represent the salient region, and output the first quantized image to the second hierarchy; and
      a first decoder configured to generate a reconstructed version of the image based at least in part on the first quantized image,
   wherein the second hierarchy includes at least:
      a second encoder configured to convert the first quantized image into a second set of channels;
      a second masking function configured to identify an important region and a non-important region within the first quantized image from the first hierarchy;
      a second quantizer configured to generate a second quantized image using a fewer number of bits to represent the non-important region than a number of bits used to represent the important region; and
      a second decoder configured to output, based at least in part on the second quantized image, additional compression information to the first hierarchy, wherein the additional compression information indicates additional compression performed in the second hierarchy;
   wherein the first hierarchy of the trained image compression network further includes a conditional arithmetic encoder configured to receive the additional compression information from the second decoder of the second hierarchy, and
   wherein the conditional arithmetic encoder of the first hierarchy is configured to generate a first bit string based at least in part on the first quantized image from the first quantizer and the additional compression information from the second decoder in a manner that minimizes a loss function configured to penalize distortion in the salient region of the image to a greater extent than distortion in the non-salient region of the image.

2. The system of claim 1, wherein the second hierarchy further includes an independent arithmetic encoder configured to generate a second bit string based at least in part on the second quantized image from the second quantizer.

3. The system of claim 1, wherein the processor is configured to execute further program instructions to at least generate a reconstructed version of the image based at least in part on: (i) the first bit string from the conditional arithmetic encoder, and (ii) the additional compression information from the second decoder.

4. The system of claim 1, wherein the first masking function is configured to identify the salient region and the non-salient region using a saliency mask, wherein the saliency mask is a two-dimensional map having a plurality of binary values that correspond to each pixel in the image.

5. A computer-implemented method comprising:
   receiving an image to be compressed;
   identifying, by a first hierarchy of an image compression network, a salient region in the image and a non-salient region in the image, wherein the non-salient region is different from the salient region;
   quantizing, by the first hierarchy, the image such that a first number of bits is used to represent the non-salient region and a second number of bits is used to represent the salient region, wherein the second number is greater than the first number;
   identifying, by a second hierarchy of the image compression network, an important region within the quantized image from the first hierarchy and a non-important region within the quantized image from the first hierarchy, wherein the non-important region is different from the important region;
   quantizing, by the second hierarchy, the quantized image such that a third number of bits is used to represent the non-important region and a fourth number of bits is used to represent the important region, wherein the fourth number is greater than the third number;
   outputting, by the second hierarchy, additional compression information to the first hierarchy, wherein the additional compression information indicates additional compression performed in the second hierarchy; and
   generating, by the first hierarchy, a first bit string based at least in part on the image quantized by the first hierarchy and the additional compression information from the second hierarchy in a manner that minimizes a loss function configured to penalize distortion in the salient region of the image to a greater extent than distortion in the non-salient region of the image.

6. The computer-implemented method of claim 5, further comprising generating the first bit string such that the salient region of the image is further compressed based at least in part on the additional compression information.

7. The computer-implemented method of claim 5, further comprising generating, by the second hierarchy, a second bit string based at least in part on the quantized image quantized by the second hierarchy.

8. The computer-implemented method of claim 7, further comprising:
generating, by the second hierarchy and based at least in part on the second bit string, the additional compression information; and
outputting, by the second hierarchy, the additional compression information to the first hierarchy.

9. The computer-implemented method of claim 5, further comprising storing, by the first hierarchy, the first bit string in a storage device.

10. The computer-implemented method of claim 9, further comprising:
accessing the first bit string from the storage device; and
generating, by the first hierarchy and based at least in part on the first bit string, a reconstructed version of the image.

11. The computer-implemented method of claim 5, further comprising identifying the salient region and the non-salient region using a saliency mask.

12. The computer-implemented method of claim 11, wherein the saliency mask is a two-dimensional map having a plurality of binary values that correspond to each pixel in the image.

13. A non-transitory computer-readable medium storing instructions that, when executed by a computing system, cause the computing system to perform operations comprising:
identifying, in an image to be compressed, by a first stage of an image compression system, a first region and a second region, wherein the first region is different from the second region;
quantizing, by the first stage, the image such that a first number of bits is used to represent the first region and a second number of bits is used to represent the second region, wherein the second number is greater than the first number;
identifying, by a second stage of the image compression system, a third region and a fourth region within the quantized image from the first stage, wherein the third region is different from the fourth region;
quantizing, by the second stage, the quantized image such that a third number of bits is used to represent the third region and a fourth number of bits is used to represent the fourth region, wherein the fourth number is greater than the third number;
outputting, by the second stage, additional compression information to the first stage, wherein the additional compression information indicates additional compression performed in the second stage; and
generating, by the first stage, a first bit string based at least in part on the image quantized by the first stage and the additional compression information from the second stage in a manner that minimizes a loss function configured to penalize distortion in the first region of the image to a greater extent than distortion in the second region of the image.

14. The non-transitory computer-readable medium of claim 13 storing further instructions that, when executed by the computing system, cause the computing system to perform operations comprising: generating the first bit string such that the first region of the image is further compressed based at least in part on the additional compression information.

15. The non-transitory computer-readable medium of claim 13 storing further instructions that, when executed by the computing system, cause the computing system to perform operations comprising: generating, by the second stage, a second bit string based at least in part on the quantized image quantized by the second stage.

16. The non-transitory computer-readable medium of claim 15 storing further instructions that, when executed by the computing system, cause the computing system to perform operations comprising:
generating, by the second stage and based at least in part on the second bit string, the additional compression information; and
outputting, by the second stage, the additional compression information to the first stage.

17. The non-transitory computer-readable medium of claim 13 storing further instructions that, when executed by the computing system, cause the computing system to perform operations comprising:
accessing the first bit string from a storage device; and
generating, by a first decoder of the first stage and based at least in part on the first bit string, a reconstructed version of the image.

18. The non-transitory computer-readable medium of claim 13, wherein the first region in the image comprises a salient region and the second region in the image comprises a non-salient region.

19. The non-transitory computer-readable medium of claim 18 storing further instructions that, when executed by the computing system, cause the computing system to perform operations comprising: identifying the salient region and the non-salient region using a saliency mask, wherein the saliency mask is a two-dimensional map having a plurality of binary values that correspond to each pixel in the image.

20. The non-transitory computer-readable medium of claim 13, wherein the third region in the image comprises an important region and the fourth region in the image comprises a non-important region.

* * * * *